3,296,235
COPOLYMER OF ACRYLAMIDE AND N-ALKYL ACRYLAMIDE WITH A PROPELLANT IN AEROSOL SPRAY CANS

Hans Zoebelein, Monheim, Rhineland, and Manfred Dohr, Dusseldorf-Holthausen, Germany, assignors to Henkel & Cie, G.m.b.H., Dusseldorf-Holthausen, Germany, a corporation of Germany
No Drawing. Filed July 8, 1964, Ser. No. 381,211
Claims priority, application Germany, Feb. 16, 1960, H 38,668; May 7, 1960, H 39,372
2 Claims. (Cl. 260—89.7)

The present application is a continuation-in-part of applications Serial Nos. 89,113, filed February 14, 1961, and 89,923, filed February 17, 1961, both abandoned.

This invention relates to viscous compositions useful as pastes, ointments, improved coating and adhesive agents, and the like. It more particularly relates to film-forming coating agents which consist of solutions of copolymers of acrylamide and N-substituted acrylamides, the substituents being alkyl radicals having a total of 2 to 6 carbon atoms, and aliphatic alcohols and/or water, to which additional solvents, such as halogenated hydrocarbons, may be added, if desired. The term "alcohol" is intended to mean water-miscible alcohols, that is primarily ethanol as well as methanol, isopropanol and n-propanol. Other suitable water-miscible solvents are, for example, acetone, dioxane, ethylene glycol, glycerin, ethylene glycol monoethyl ether, dimethylformamide, and the like.

In accordance with a preferred embodiment, the substituent at the nitrogen atom is a tertiary-butyl radical, and the weight ratio of acrylamide to N-tertiary-butyl acrylamide in the polymer is 5.5:4.5 to 1:8.5.

It is known to use polyacrylamide as a thickener for aqueous solutions. However, polyacrylamide dissolves only in water-ethanol mixtures having a maximum content of 30% by volume of alcohol and is, therefore, not suitable for thickening mixtures with a higher alcohol content.

Polyvinyl alcohol or partially saponified polyvinyl acetate have been suggested as thickeners for aqueous alcoholic solutions. While these substances are soluble in alcohol-water mixtures, it is necessary to use a product which is adapted to the water-alcohol ratio from the point of view of degree of hydrolysis and molecular weight. Consequently, relatively small changes in the alcohol-water ratio make it necessary to use a different product as the thickener.

Polyvinyl pyrrolidone has also frequently been used for thickening aqueous and aqueous alcoholic solutions. However, only those types of polyvinyl pyrrolidone whose thickening effect is relatively low are useful for this purpose, because the alcohol solubility decreases with increasing molecular weight.

Furthermore, it has been suggested to modify copolymers, which are entirely or partially prepared from unsaturated polycarboxylic acid amides and which are insoluble in water-alcohol mixtures, by a heat treatment in aqueous solution so that they become soluble in an aqueous alcoholic medium. Such products also produce a thickening effect. However, the heat treatment is time-consuming and it is difficult to isolate these products in solid form. In addition, ammonia is split off during the heat treatment. The use of these polymers is thereby adversely influenced in many instances.

It is known that copolymers of esters of unsaturated carboxylic acids and N-substituted acrylic acid amides, whose ester groups were saponified after the polymerization, may be used as hair setting sprays and as coating agents for skin areas. Quite aside from the awkward two-step process for their preparation, the films produced with these products do not have a clear appearance and only a low strength. Furthermore, they are hygroscopic and consequently, soften in a moist atmosphere.

It has now surprisingly been found that copolymers produced by known methods from unsubstituted acrylamide and N-substituted acrylamide do not exhibit the above-mentioned disadvantages and may be used to form viscous compositions and possess film-forming properties, especially if the alkyl radicals of the N-alkyl-acrylamide contain 2 to 6 carbon atoms. Examples of suitable substituents are the following: n-propyl, isopropyl, n-butyl, isobutyl, tertiary-butyl, n-pentyl- isopentyl, and neopentyl. The substituted acrylamide may also carry two substituents at the nitrogen atom, the total number of carbon atoms in the substituents being preferably 2 to 6, such as two ethyl radicals or one methyl and one propyl radical. The copolymers used in accordance with the invention may further contain several of the above-mentioned N-substituted acrylamides.

It is an object of this invention to provide an acrylamide polymer which may be used to form viscous compositions comprising water and water-miscible organic solvents.

It is a further object to provide a thickener which may be used in a water and water-miscible organic solvent solution which is applicable to a broad range of water-solvent ratios to form viscous compositions.

It is an object of this invention to produce an acrylamide polymer composition having film-forming properties wherein the film is clear, strong and does not soften under humid conditions.

Another object of this invention is to provide an acrylamide polymer composition having good film-forming properties useful in aerosol spray containers.

Yet another object of this invention is to provide a compositions having improved film-forming and adhesive properties comprising a mixture of substituted and unsubstituted acrylamide polymers.

A further object of this invention is to provide a method for improving the film-forming properties of acrylamide by incorporating therein a quantity of an N-substituted acrylamide polymer having an alkyl substituent with 2 to 6 carbon atoms.

These and other objects of this invention will become apparent as the description thereof proceeds.

The quantitative ratio of unsubstituted to substituted acrylamide in the copolymers depends upon the contemplated purpose of use and upon the structure of the substituted acrylamide. By means of simple preliminary tests, it is possible to prepare without difficulties a product which has the particular desired solubility and other properties. Particularly favorable film-forming properties are exhibited by copolymers of acrylamide and N-tertiary-butyl acrylamide in which the weight ratio of unsubstituted to substituted acrylamide is between 5.5:4.5 and 1:8.5.

Copolymers of acrylamide and N-tertiary-alkyl acrylamide in a weight ratio of about 3:7 to 8:2, preferably about 1:1, are particularly advantageous for viscous mixtures consisting of water and/or water-miscible organic solvents, such as alcohols (useful as ointments, pastes, or the like, or for solutions prepared with the aid of such mixtures.

The copolymers according to the invention exhibit excellent thickening properties for forming viscous compositions without any necessity for a subsequent treatment in any form. Furthermore, they may be used over a wide mixture ratio of 80 to 90% alcohol up to pure water, so that the mixture ratio of alcohol to water can be varied to any desired extent without the necessity of changing the composition or the degree of polymerization of the thickeners. A similar breadth of operativeness is also applicable to their use with other water-miscible solvents. This fact could in no way be foreseen in view of the above-described properties of partially saponified polyvinyl acetate.

The products according to the invention are prepared by copolymerization of acrylamide and N-tertiary-butyl acrylamide, for example, advantageously in aqueous solution in the presence of a water-miscible organic solvent. The latter serves as a solution promoter for the water-insoluble N-tertiary-butyl acrylamide. It is also possible to copolymerize additional polymerizable monomeric compounds, provided that the solubility ratio is not altered thereby. The concentration of the monomers is preferably selected such that a 5 to 30% solution is polymerized.

Examples of suitable solution promoters for the N-tertiary-butyl acrylamide are the following: methanol, ethanol, isopropanol, acetone and dioxane. The amount of solution promoter is selected such that a clear solution is formed at the particular polymerization temperature.

The polymerization is carried out in accordance with well-known principles, preferably at moderately elevated temperature and in the presence of customary catalysts. Suitable catalysts, which are used in a concentration of 0.01 to 1%, based on the total monomeric content, are the following, for example: peroxides, such as potassium persulfate, ammonium persulfate, hydrogen peroxide or, in the event that the polymerization is carried out in the presence of larger amounts of organic solvents, organic peroxides, such as benzoyl peroxide, diacetyl peroxide, cumene peroxide, cyclohexanone peroxide and lauroyl peroxide. Most advantageously, redox-systems of peroxide catalysts and reducing agents are used as polymerization catalysts. Examples of suitable reducing agents are the following: sodium sulfite, sodium bisulfite, sodium pyrosulfite, sodium dithionite, rongalite, or sodium thiosulfate. Furthermore, it is possible to initiate the polymerization by means of other known radical-forming compounds, such as azobutyric acid dinitrile.

The polymerization is generally complete after a few hours and proceeds virtually quantitatively. The separation of the reaction mixture or the isolation of the copolymers according to the invention may be accomplished in accordance with methods which are, as such, well-known. If it is desired to obtain an aqueous solution, the organic solvent used as the solution promoter for the monomeric N-tertiary-butyl acrylamide may be removed in vacuo and at slightly elevated temperature, if necessary. If the aqueous solution of the polymers according to the invention is heated to 90° C. or above, the polymers separate out in the form of a gel and may be filtered off. The addition of sufficient amounts of acetone to the original reaction mixture makes it possible to precipitate the products in a satisfactorily filterable form.

It is advantageous to place the raw polymerization solutions directly on a heated ribbon or on heated rolls, whereby the polymer is obtained in the form of a solid, white, powdery mass.

Furthermore, the products according to the invention may be obtained in a satisfactorily soluble, fine granular form by means of spray drying.

Highly viscous solutions in water and in organic solvents which are miscible with water may be prepared from the copolymers according to the invention, without further treatment, especially in mixtures consisting of water and lower monovalent alcohols, such as ethanol, methanol, isopropanol and N-propanol, as well as in mixtures consisting of water and other water-miscible organic solvents, such as acetone, dioxane, ethylene glycol, glycerin, ethylene glycol monoethyl ether, dimethylformamide, and the like.

In the following table the solubility of acrylamide copolymers in water-ethanol mixtures is shown in which the substituted acrylamide is N-tertiary-butyl acrylamide. The symbols have the following meanings:

1 = soluble,
— = insoluble,
s = difficulty soluble or swellable.

SOLUBILITY OF THE COPOLYMERS IN AQUEOUS ETHANOL

| Percent by weight of N-substituted butylacrylamide in the polymer | Concentration of the alcohol in volume percent | | | | | |
|---|---|---|---|---|---|---|
| | 0% | 20% | 40% | 60% | 80% | 95% |
| 0 | 1 | 1 | s | s | — | — |
| 25 | 1 | 1 | 1 | 1 | s | — |
| 33 | 1 | 1 | 1 | 1 | s | — |
| 40 | 1 | 1 | 1 | 1 | 1 | s |
| 50 | 1 | 1 | 1 | 1 | 1 | s |
| 60 | 1 | 1 | 1 | 1 | 1 | 1 |
| 66 | 1 | s | 1 | 1 | 1 | 1 |
| 75 | s | s | 1 | 1 | 1 | 1 |
| 80 | — | s | s | 1 | 1 | 1 |
| 90 | — | — | s | 1 | 1 | 1 |
| 100 | — | — | s | s | s | 1 |

The copolymers according to the invention exhibit a considerably greater thickening effect for forming viscous compositions in aqueous alcoholic solutions and other mixtures consisting of water and water-miscible organic solvents than a commercial polyvinyl pyrrolidone compound with a K-value of 90 which is recommended for the same purpose. With the aid of the latter compound a viscosity of 85 cp. can be achieved in 4% aqueous solution, whereas the copolymers according to the invention exhibit values of 1000 cp. and more at the same concentration in aqueous solution. Aqueous alcoholic solutions of the copolymers have in most cases a considerably higher viscosity in comparison to a purely aqueous solution. The compatibility of solutions thickened with the copolymers according to the invention toward electrolytes is good and corresponds to the compatibility of customary thickeners, such as solutions thickened with commercial polyvinyl pyrrolidone and having the same viscosity. The viscous compositions may successfully be employed for cosmetic or pharmaceutical compositions containing alcohol, for example, and quite generally in those instances where it is desired to obtain highly viscous solutions, pastes or ointments which contain alcohol or other water-miscible solutions in addition to water.

The above-mentioned copolymers are suitable for the production of coatings, for example, on skin areas, and as adhesive agents for various purposes. Furthermore, they exhibit especially favorable properties as hair fixing agents. They form clear, virtually colorless films with good cohesive properties, which do not comprise any "crystalline" appearing components and, therefore, do not produce a flaking effect.

The films are not hygroscopic and also hardly soften in a moist atmosphere. Despite these properties, the films produced from the above-mentioned copolyymers exhibit a sufficient water solubility or, if they contain higher proportions of substituted acrylamides, such as tertiary-butyl acrylamide, they exhibit good emulsifying properties in water so that the coatings may readily be removed again.

A further advantage of the products used in accordance with the invention is the miscibility of their solutions in lower aliphatic alcohols with halogenated hydrocarbons, such as methyl chloride and lower fluorochlorohydrocarbons. This property makes it possible to use the solutions in aerosol spray cans. In the preparation of the alcoholic solutions for this purpose, care should be taken that in most cases small amounts of water should be added in order to achieve a homogeneous solution of the mixed polymer in ethyl alcohol or isopropyl alcohol. However, only so much water should be added that a sufficient solubility is just barely reached, so that when the solutions are admixed with the propellant for the spray can, no separation of water takes place.

When the copolymers are used as hair setting agents, other additives which are commonly used for this purpose may be added, such as perfume and small amounts of surface-active substances. The addition of hydrophobic additives is in most instances not required. For use as hair setting agents which are to be dispensed from spray cans, especially copolymers of acrylamide and N-tertiary-butyl acrylamide, in which the weight ratio lies between 1:7 and 1:8, are particularly suitable. While these copolymers do not dissolve in pure water, they may readily and completely be removed from the hair with the aid of the usual shampoos.

Furthermore, the mixed polymers according to the invention may be employed as coating agents for metals such as machine parts, in order to prevent corrosion and contamination by dirt. For this purpose, the products produced from acrylamide and N-tertiary-butyl acrylamide, in which the weight ratio of the starting materials is between about 1:7 and 1:8, are also particularly suitable. The machine parts coated with a film made of the above-mentioned copolymers can be stored for a long period of time. Immediately prior to their use, the film may be removed with the aid of well-known aqueous solutions of cleaning agents, such as dodecyl benzene sulfonate. Of course, known corrosive inhibitors, such as dicyclohexyl ammonium nitrite, sodium benzoate, thiourea, and substituted thioureas, may be added to the film-forming solutions. In this manner, individual machine parts or, for example, entire automobiles, may be coated and may then be stored, even outdoors, because of the resistance against water of the copolymers comprising a high percentage of substituted acrylamide.

Furthermore, hygroscopic substances may be coated with a thin film of the copolymers according to the invention in order to protect them against the influence of a moist atmosphere. Thus, detergent tablets which have been impregnated by immersion in an alcoholic solution of the copolymers may be stored in humid rooms, such as in the bathroom, for long periods of time without becoming tacky or unsightly.

Because of the solubility of those copolymers which contain approximately equal amounts of acrylamide and substituted acrylamide in alcohol and water, it is also possible to coat tablets of alcohol-soluble dyes by immersing them into aqueous solutions of the copolymers. A good cohesion of the tablets is achieved thereby and dusting of the dye is prevented. Upon introduction of the tablets into alcohol, accompanied by stirring, the coating as well as the tablet itself dissolve.

The following examples will further illustrate the invention and enable persons skilled in the art to understand the invention more completely. It is understood however, that the examples are illustrative only and that the invention is not limited to the specific examples recited.

Example I 500 gm. acrylic acid amide were dissolved in 7 liters of water, the solution was heated to 54° C. and admixed with a warm solution of 500 gm. N-tertiary-butyl acrylamide in 2 liters of methanol. A solution of 1 gm. ammonium persulfate in 500 cc. water and a solution of 2 gm. sodium pyrosulfite in 500 cc. water were used as catalysts. 20 cc. of each of these solutions was first added to the reaction mixture, which had a temperature of 54° C., accompanied by stirring. After 20 minutes, additional 10 cc. of each of the two solutions were added. Thereafter, stirring was continued for one hour and the reaction mixture was allowed to stand overnight. The product was dried on a heated roll. A 5% solution of this polymer in water exhibited a viscosity of 1403 cp. The viscosity of aqueous alcoholic solutions was up to 50% higher, depending upon the alcohol content.

The solubility of the copolymer thus obtained in water-alcohol mixtures is shown in the table above (50% by weight of butyl acrylamide in the polymer).

The process was repeated in the same manner, but acetone was used as the solvent for the N-tertiary-butyl acrylamide in place of methanol. The properties of the product obtained thereby were substantially the same.

Example II 50 gm. of acrylic acid amide were dissolved in 750 cc. water and a solution of 50 gm. N-tertiary-butyl acrylamide in 150 cc. methanol was added to this solution at 60° C. 0.01 gm. ammonium persulfate in 5 cc. water was added to the clear solution of the monomers at 70° C., accompanied by stirring. The reaction mixture was allowed to stand overnight without stirring. The clear, highly viscous solution thus obtained was transformed into a solid product by drying on a heated roll. A 5% aqueous solution of this product had a viscosity of 1100 cp.

Example III 15 gm. of acrylamide and 15 gm. N-tertiary-butyl acrylamide were dissolved in a mixture of 165 cc. water and 50 gm. acetone, and this solution was admixed at 60° C. with a solution of 0.025 gm. potassium persulfate in 30 cc. water. The polymerization lasted for 2 hours at this temperature. By drying of the polymerization solution on a heated roll a powder was obtained which had a K-value of 113.

Example IV

A solution of 16.5 gm. N-tertiary-butyl acrylamide in 80 gm. of acetone was added to a solution of 13.5 gm. acrylamide and 0.03 gm. sodium pyrosulfite in 180 cc. water, and the mixed solution was polymerized at 40° C. over a period of six hours after adding a solution of 0.03 gm. ammonium persulfate in 10 cc. water. The dry product obtained after working up the reaction mixture analogous to Example I had a K-value of 110. It was soluble over the entire range of water-alcohol mixtures from pure water to 96% alcohol.

Example V 15 gm. acrylamide and 7.5 gm. N-tertiary-butyl acrylamide were polymerized over a period of 1½ hours in a mixture of 225 cc. water and 20 gm. acetone at 60° C. with the aid of a solution of 0.115 gm. potassium persulfate in 30 cc. water. The solubility of the polymer obtained by working up the reaction mixture analogous to Example I is shown in the table. The K-value was 109.

Example VI

A solution of 18 gm. acrylamide and 0.03 gm. sodium pyrosulfate in 200 cc. water, which had been heated to 40° C. was admixed with a solution of 12 gm. N-tertiary-butyl acrylamide in 60 gm. acetone. A solution of 0.03 gm. ammonium persulfate in 10 cc. water was added dropwise at the indicated temperature within a period of 10 minutes in an atmosphere of nitrogen. The polymerization was complete after seven hours. The copolymer, isolated by precipitation with acetone, had a K-value of 112.5. It was still swellable in 93% alcohol.

Example VII

A solution of 12 gm. acrylamide and 0.03 gm. sodium pyrosulfate in 180 cc. water was admixed with a solution of 18 gm. N-tertiary-butyl acrylamide in 90 gm. acetone. By adding thereto a solution of 0.03 gm. ammonium persulfate in 10 cc. water a polymerization was initiated which lasted 7 hours at a temperature of 40° C. The reaction solution, worked up in the same manner as in Example I, yielded a polymerization product having a K-value of 101.

*Example VIII*

A solution of 15 gm. acrylamide and 0.09 gm. sodium pyrosulfite in 220 cc. water and a solution of 30 gm. N-tertiary-butyl acrylamide in 165 cc. acetone were polymerized at 40° C. within a period of three hours by adding 0.09 gm. ammonium persulfate in 20 cc. water. After completion of the reaction a light colored powder with a K-value of 90 was obtained by drying the reaction mixture on a heated roll.

*Example IX*

A solution of 24 gm. acrylamide in 240 cc. water was admixed with a solution of 6 gm. N-tertiary-butyl acrylamide in 30 cc. acetone at 40° C. A solution of 0.03 gm. ammonium persulfate in 5 cc. water and a solution of 0.03 gm. sodium pyrosulfite in 5 cc. water were added dropwise to the mixture over a period of 20 minutes, accompanied by stirring. Thereafter, the reaction mixture was allowed to stand for seven hours. The polymer was precipitated from the viscous solution thus obtained by addition of acetone. A 5% solution of this product in water had a viscosity of 4500 cp.

*Example X*

A solution of 15 gm. of acrylamide and 0.09 gm. of sodium pyrosulfite in 220 cc. of water and a solution of 30 gm. of N-tertiary-butyl acrylamide in 165 cc. of acetone were combined and after adding 0.09 gm. of ammonium persulfate in 20 cc. of water, the mixture was polymerized for 3 hours at 40° C. After the reaction was complete, the reaction mixture was dried on heated rolls, yielding a light powder having a K-value of 84. 16 gm. of the dried powder were suspended by stirring in 170 cc. of isopropanol and 14 cc. of water were added to the suspension. After a short period of time a homogeneous, highly viscous solution was formed.

4 gm. of this solution, together with 35.5 gm. of alcohol, 0.5 gm. of perfume and 60 gm. of dichlorodifluoromethane, were filled into an aerosol spray can. This solution was suitable for use as a hair spray and upon being sprayed furnished a water-soluble, clear film having excellent cohesive properties. Even in a moist atmosphere, this film did not become unsightly and tacky. However, it was readily removable again with water.

*Example XI*

A solution of 18 gm. of acrylamide and 0.05 gm. of sodium pyrosulfite in 120 cc. of water was heated to 40° C. and was combined with a solution of 72 gm. of N-tertiary-butyl acrylamide in 680 cc. of acetone which had been saturated with nitrogen. After heating the mixture to 40° C., the polymerization was initiated by adding 0.09 gm. of ammonium persulfate in 10 cc. of water. After a short period of time, the temperature rose to 44° C. The reaction vessel was allowed to stand overnight on a water bath at 40° C., and the polymer was then precipitated by pouring the solution into a large quantity of water. After drying, 81 gm. of a white product, corresponding to 90% of theory, which had a K-value of 94, was obtained. The reaction product was soluble in isopropanol without adding any water. The solution was miscible with halogenated hydrocarbons. An 0.8% isopropanol solution, together with dichlorodifluoromethane, was filled into an aerosol spray can. Upon spraying, a clear, water-insoluble film was formed which, however, was rapidly and completely soluble in dilute solutions of the customary washing agents. Because of these properties, the above-described mixture could advantageously be used as a hair spray.

*Example XII*

15 gm. of acrylamide and 15 gm. of N-tertiary-butyl acrylamide were dissolved in a mixture of 165 cc. of water and 50 gm. of acetone, and the resulting solution was admixed at 60° C. with a solution of 0.025 gm. of potassium persulfate in 30 cc. of water. After polymerization for 2 hours, the solution thus obtained was dried on a heated roll, yielding a fluffy light powder.

20 gm. of this product were dissolved in 250 cc. of 90% ethanol. Into this solution washing agent tablets, weighing 50 gm. each, were immersed, the tablets had the following composition.

| Tablet mixture: | Percent |
|---|---|
| Tetrapropylbenzenesulfonate | 5 |
| Perborate | 20 |
| Ethyleneoxide addition products with nonylphenol | 2 |
| Soap | 10 |
| Sodium tripolyphosphate | 45 |
| Carboxymethylcellulose | 1 |
| Water glass | 1 |
| Sodium sulfate | 11 |
| Water | 5 |

The immersed tablets were then air-dried. The tablets coated with a layer of the copolymer of equal portions of acrylamide and N-tertiary-butyl acrylamide remained dry and of good appearance even after storage in a moist atmosphere at 30° C. for 10 weeks. Upon being introduced into slightly agitated water, the tablets rapidly dissolved.

*Example XIII*

A solution of 30 gm. of acrylamide, 70 gm. of N-tertiary-butyl acrylamide in 650 cc. of water and 300 gm. of acetone was copolymerized at 40° C. in the usual manner in the presence of 0.1 gm. of sodium pyrosulfite and 1.3 gm. of ammonium persulfate, and after 6 hours the resulting solution was dried on a heated ribbon to yield a fluffy light powder. A 4% solution of the reaction product, together with 5% of thiourea based on the copolymer, was produced.

Pieces of sheet iron 4 x 12 cm. in size was immersed into this solution and were then air dried. The sheets were stored for 12 weeks at 25° C. in moist atmosphere. At the end of this period, the sheets were still clean. The film of the copolymer was washed off with a 1% solution of a technical alkyl benzene sulfonate at 40° C. without difficulty.

*Example XIV*

A 4% aqueous solution was prepared from a copolymer of equal parts of acrylamide and N-tertiary-butyl acrylamide. Pressed tablets of the alcohol-soluble dye, which is available iin commerce under the name "Nigrosin spritlöslich" (see G. Schultz, Farbstofftabellen, 1931, p. 427) were coated by immersion with this aqueous solution. The tablets thus obtained did not dust and were readily dissolvable in alcohol.

While we have set forth certain specific examples and preferred modes of practice of our invention, we wish it to be understood that we do not intend to be limited thereby and that various changes and modifications may be made in the invention without departing from the spirit of the disclosure or the scope of the appended claims.

We claim:

1. A composition for use as a film-forming coating and adhesive agent in aersol spray cans, consisting essentially of a solution of copolymers consisting of acrylamide and N-alkyl acrylamides wherein the alkyl substituent contains from 2 to 6 carbon atoms in lower aliphatic alcohols, in admixture with a propellant the ratio of acrylamide to N-alkyl acrylamide is from about 5.5:4.5 to 1:8.5 by weight.

2. A composition for use as a film-forming coating and adhesive agent in aerosol spray cans, consisting essentially of a solution of copolymers consisting of acrylamide and N-alkyl acrylamides wherein the alkyl substituent contains from 2 to 6 carbon atoms in lower aliphatic alcohols, in admixture with a volatile fluorochloro-hydrocarbon propellant, the ratio of acrylamide to N-alkyl acrylamide is from about 5.5:4.5 to 1:8.5 by weight.

References Cited by the Examiner

UNITED STATES PATENTS

| | | | |
|---|---|---|---|
| 2,311,548 | 2/1943 | Jacobson | 260—89.7 |
| 3,014,886 | 12/1961 | Harding | 260—29.6 |
| 3,112,296 | 11/1963 | Maeder | 260—80.3 |

MURRAY TILLMAN, *Primary Examiner.*

P. LIEBERMAN, *Assistant Examiner.*